United States Patent
Gonthier et al.

(10) Patent No.: US 9,263,966 B2
(45) Date of Patent: Feb. 16, 2016

(54) POWER SUPPLY CIRCUIT WITH LOW STAND-BY LOSSES

(75) Inventors: Laurent Gonthier, Tours (FR); Antoine Passal, Monnaie (FR)

(73) Assignee: STMICROELECTRONICS (TOURS) SAS, Tours (FR)

( * ) Notice: Subject to any disclaimer, the term of this patent is extended or adjusted under 35 U.S.C. 154(b) by 0 days.

(21) Appl. No.: 13/332,393

(22) Filed: Dec. 21, 2011

(65) Prior Publication Data

US 2012/0163050 A1 Jun. 28, 2012

(30) Foreign Application Priority Data

Dec. 23, 2010 (FR) ..................................... 10 61118
Aug. 8, 2011 (FR) ..................................... 11 57231

(51) Int. Cl.
*H02M 5/42* (2006.01)
*H02M 7/155* (2006.01)
*H02M 1/00* (2007.01)

(52) U.S. Cl.
CPC ............ *H02M 7/1557* (2013.01); *H02M 7/155* (2013.01); *H02M 2001/0032* (2013.01); *Y02B 70/16* (2013.01)

(58) Field of Classification Search
CPC ..... H02M 7/066; H02M 7/1557; H02M 1/32; H02M 3/33592; H02M 7/1555
USPC ......... 363/67, 76, 84, 126; 323/126, 239, 908
See application file for complete search history.

(56) References Cited

U.S. PATENT DOCUMENTS

| | | | |
|---|---|---|---|
| 3,421,063 A | 1/1969 | Reinke | |
| 5,654,884 A * | 8/1997 | Mohan | 363/126 |
| 6,018,473 A * | 1/2000 | Claassen | 363/128 |
| 6,195,271 B1 | 2/2001 | Suzuki et al. | |
| 6,269,012 B1 * | 7/2001 | Kusakabe et al. | 363/84 |
| 6,373,319 B1 * | 4/2002 | Rault | 327/452 |
| 6,693,803 B2 * | 2/2004 | Beranger et al. | 363/21.07 |
| 7,483,280 B2 * | 1/2009 | Benabdelaziz et al. | 363/44 |
| 7,545,131 B1 * | 6/2009 | Alexander | 323/284 |
| 2008/0123379 A1 * | 5/2008 | Smidt et al. | 363/85 |
| 2009/0103338 A1 * | 4/2009 | Nakamura | 363/89 |
| 2009/0185402 A1 * | 7/2009 | Lam et al. | 363/126 |
| 2010/0080022 A1 * | 4/2010 | Schmidt | 363/53 |
| 2010/0080025 A1 | 4/2010 | Terlizzi et al. | |

(Continued)

FOREIGN PATENT DOCUMENTS

DE 1178115 B 9/1964
DE 19812736 A1 9/1999

(Continued)

OTHER PUBLICATIONS

French Search Report and Written Opinion dated Oct. 5, 2011from corresponding French Application No. 10/61118.
French Search Report and Written Opinion dated Jan. 16, 2012from corresponding French Application No. 11/57231.

*Primary Examiner* — Adolf Berhane
*Assistant Examiner* — Alex Torres-Rivera
(74) *Attorney, Agent, or Firm* — Allen, Dyer, Doppelt, Milbrath & Gilchrist, P.A.

(57) ABSTRACT

A circuit for converting an A.C. power supply voltage into a D.C. voltage, including: a first branch capable of providing a first power level; and a second parallel branch capable of providing a second power level greater than the first one, the second branch including a bidirectional activation switch.

26 Claims, 4 Drawing Sheets

(56) References Cited

U.S. PATENT DOCUMENTS

2012/0062205 A1* 3/2012 Levesque et al. ............ 323/318
2013/0033905 A1* 2/2013 Lin et al. .................... 363/21.13

FOREIGN PATENT DOCUMENTS

| DE | 19934850 A1 | 1/2001 |
|---|---|---|
| WO | WO 2010103458 A2 | 9/2010 |

* cited by examiner

POWER SUPPLY CIRCUIT WITH LOW STAND-BY LOSSES

CROSS REFERENCE TO RELATED APPLICATIONS

This application claims the priority benefit of French patent application number 11/57231, filed on Aug. 8, 2011, and the priority benefit of French patent application number 10/61118, filed on Dec. 23, 2010, which applications are hereby incorporated by reference to the maximum extent allowable by law.

BACKGROUND

1. Technical Field

Embodiments generally relate to electronic circuits, and more specifically to power supply circuits intended for electronic devices (circuits or circuit assemblies) having at least two operating modes requiring different power supply voltages. Embodiments more specifically apply to a power supply circuit for an electronic device having a stand-by mode of lower power consumption than an active mode.

2. Discussion of the Related Art

In many electronic devices, unnecessary power consumption of the power supply circuit during periods when the powered device is not active is desired to be avoided. Several power supply circuits which are activated independently from one another according to needs are generally provided.

Such devices are relatively complex. In particular, they require selectors downstream of rectifying means.

Further, most often, a control signal is issued by the powered device to activate or deactivate the different power supply modes. Such control signals are generally logic signals originating from a microcontroller of the powered device. This requires interface circuits between the powered device and the power supply circuit. Further, this requires additional terminals on the power supply circuit side and on the powered device side.

It would be desirable to have a power supply circuit with a decreased loss, especially in stand-by mode.

It would further be desirable to have a self-contained power supply circuit capable of adapting to the power required by the load, without for a control signal to have to be issued by said load.

SUMMARY

An embodiment overcomes all or part of the disadvantages of known power supply circuits with several power modes.

Another embodiment provides a simple power supply circuit, with a low loss at stand-by.

Another embodiment avoids the transmission of control signals between the powered device and the power supply circuit.

Another embodiment provides a self-contained power supply circuit, capable of switching between its two power supply modes.

An embodiment provides a circuit for converting an A.C. power supply voltage into a D.C. voltage, comprising:
 a first branch capable of providing a first power level; and
 a second parallel branch capable of providing a second power level greater than the first one, the second branch comprising a bidirectional activation switch.

According to an embodiment, each branch comprises a capacitive element in series with a resistive element, the capacitive element of the second branch having a value greater than that of the capacitive element of the first branch.

According to an embodiment, the first branch comprises a capacitive element in series with a resistive element; and the second branch comprises a transformer.

According to an embodiment, the conversion circuit further comprises a circuit for controlling said switch, analyzing the variation along time of the level of at least one piece of data representative of the D.C. voltage.

According to an embodiment, said control circuit analyzes the rate at which the D.C. voltage increases or decreases.

According to an embodiment, said control circuit comprises:
 a stage of comparison of the output voltage level with a first threshold and with a second threshold surrounding a nominal value of the D.C. power supply voltage, said second threshold being lower than the first one;
 a time counter triggered when the output voltage reaches the first threshold and having an output switching at the end of a time period; and
 a stage of activation of said switch when the output voltage is lower than the second threshold at the end of said time period set by the time counter.

According to an embodiment, the time counter is reset each time the output voltage reaches said first threshold.

According to an embodiment, said activation stage comprises a flip-flop having a data input receiving an output of said counter and having a trigger input receiving a signal depending on the result provided by the comparison stage.

According to an embodiment, the conversion circuit further comprises a stage for triggering the activation stage when the D.C. voltage becomes smaller than a third threshold, smaller than the second one.

According to an embodiment, said switch is a triac or an opto-triac.

The foregoing and other objects, features, and advantages will be discussed in detail in the following non-limiting description of specific embodiments in connection with the accompanying drawings.

DETAILED DESCRIPTION

The same elements have been designated with the same reference numerals in the different drawings, where the timing diagrams have been drawn out of scale. For clarity, only those steps and elements which are useful to the understanding of the embodiments have been shown and will be described. In particular, the destination of the power supply voltages generated by the described circuit has not been detailed, the described embodiments being compatible with usual applications of such power supply voltages.

Figure 1:
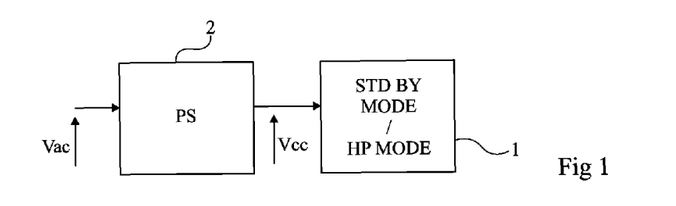
FIG. 1 generally shows in the form of blocks an embodiment of a multimode power supply system.

FIG. 1 is a block diagram of an embodiment of a system comprising an electronic device 1 to be supplied with a D.C. voltage Vcc and capable of having two respective stand-by (STD BY MODE) and high-power (HP MODE) operating modes. The system comprises a power supply circuit 2 (PS) intended to receive an A.C. voltage Vac and to deliver D.C. power supply voltage Vcc to device 1.

Figure 2:
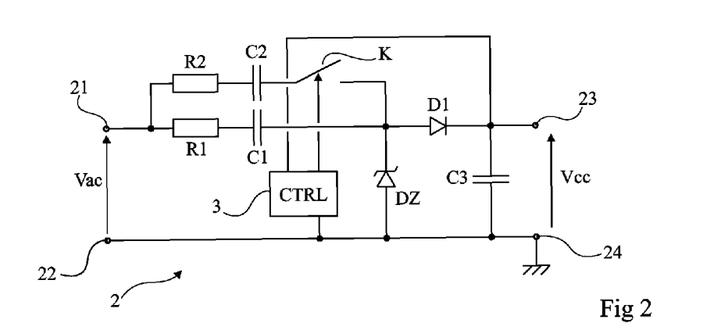
FIG. 2 is an electric diagram of an embodiment of a power supply circuit with two power modes.

FIG. 2 is a partial electric diagram of an embodiment of power supply circuit 2 of capacitive power supply type.

The circuit comprises two input terminals 21 and 22 intended to receive an A.C. power supply voltage Vac, for example, the electric distribution mains voltage, and two output terminals 23 and 24 intended to provide a D.C. power supply voltage Vcc. Terminal 24 forms the ground and is one with terminal 22 while terminal 23 corresponds, in this example, to a terminal for providing the positive power supply voltage. It should however be noted that what follows transposes to a circuit for providing a negative power supply voltage.

The capacitive power supply circuit is based on the use of a capacitive element C1 in series with a surge current limiting resistor R1 and a diode D1 between terminals 21 and 23, and of a parallel capacitor C3 connecting terminals 23 and 24 and withstanding a voltage Vcc. Diode D1 is used as a rectification element, its anode being on the side of capacitor C1. Capacitor C1 has the function of setting the current in the capacitive power supply and C3 has the function of storing and smoothing power supply voltage Vcc. A Zener diode DZ between the anode of diode D1 and ground 24 sets the value of power supply voltage Vcc, the anode of the Zener diode being on the ground side. Above-described elements R1 and C1 form a first capacitive power supply branch which, in the described embodiment, is sized to provide the stand-by current of the device to be powered.

A second branch, formed of a capacitor C2 in series with a limiting resistor R2 and a switch K, connects terminal 21 to the cathode of diode DZ (anode of diode D1). This second branch is intended to be coupled with the first one when the device to be powered requires a higher power. The turning-on of switch K is controlled by a circuit 3 (CTRL), supplied with voltage Vcc between terminals 23 and 24 and receiving, in this example, no control signal, especially from the powered device (1, FIG. 1). The function of control circuit 3 is to automatically detect the end of the stand-by mode and the end of the high-power mode by analyzing the time variation of the output voltage level. An embodiment of control circuit 3 will be described in relation with FIG. 4.

The operation of a capacitive power supply is known per se. In each rising phase of a halfwave (positive in the example of FIG. 2) of voltage Vac, a current flows through resistor R1, capacitor C1, and diode D1 to charge capacitor C3. When switch K is on, a current flows both through this first branch and through the second branch formed of capacitor C2 and of resistor R2. The respective values of capacitors C1 and C2 are selected according to the powers required for the device to be powered. The value of capacitor C2 will generally be selected to be greater than that of capacitor C1 since the power required in active mode (high power) is generally greater than twice the power required in stand-by mode.

The diagram of FIG. 2 may be completed with rectifying elements for a fullwave operation.

In the embodiment of FIG. 2, power supply circuit 2 is self-contained, in that it requires no control signal from powered device 2 to switch from a stand-by operating mode to a high-power operating mode and conversely.

Figure 2A:
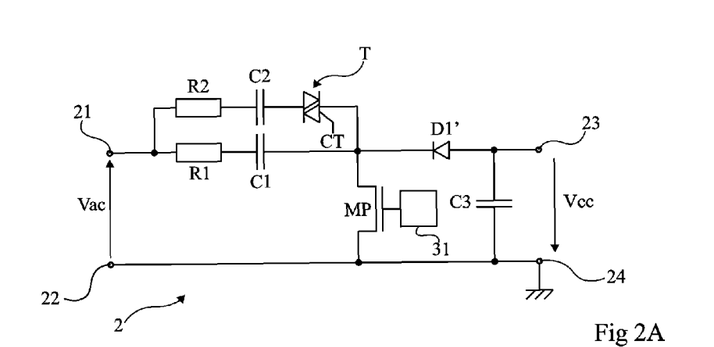
FIG. 2A is an electric diagram of another embodiment of a power supply circuit with two power modes.

FIG. 2A is an electric diagram illustrating variations of the embodiment of FIG. 2.

A first variation is that it is a circuit for providing a negative voltage. For this purpose, a diode D1' having its anode on the side of terminal 23 replaces diode D1. Capacitor C3 is then charged on the falling edges of the negative halfwaves of voltage Vac. Another variation is that diode DZ is replaced with a MOS transistor MP, having a P channel in the present example, controlled by a circuit 31 capable of setting output voltage Vcc. Still another variation is for switch K, for example a triac T, and more generally any switch which is bidirectional in terms of current (but not necessarily controllable in both biasing directions), for example, a thyristor or a transistor provided with a diode in antiparallel, to be controlled by a signal CT issued by any circuit capable of indicating a need for the switching from stand-by to the high-power mode and conversely. This signal is for example issued by the load supplied with voltage Vcc. According to this variation, power supply circuit 2 is thus not self-contained.

Figure 3:
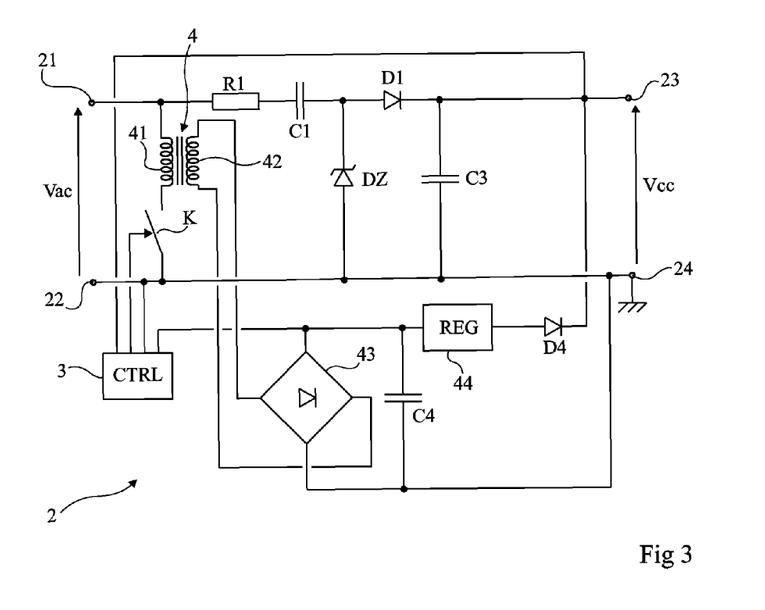
FIG. 3 is an electric diagram of still another embodiment of a power supply circuit with two power modes.

FIG. 3 shows another embodiment of a power supply circuit 2. A difference with the embodiment of FIG. 2 is that the branch intended to be activated in the high-power mode is not based on a capacitive power supply but on a transformer power supply. The drawing shows, as in FIG. 2, a first branch formed of a resistor R1 and of a capacitor C1, between terminal 21 of application of an A.C. power supply voltage Vac and the anode of diode D1, which has its cathode grounded by capacitor C3 (terminals 22 and 24). The voltage of this first power supply branch is set by Zener diode DZ.

This second branch comprises a transformer 4 having its primary winding 41 series-connected with a switch K between terminals 21 and 22 and having its secondary winding 42 connected to the A.C. input terminals of a rectifying bridge 43 (halfwave or fullwave). The rectified output terminals of bridge 43 are interconnected by a stabilization capacitor C4. A linear regulator 44 (REG) connects the positive output terminal of bridge 43 to terminal 23 via an optional diode D4, to prevent a reverse circulation originating from the first branch when switch K is off. Diode D4 may be replaced with a switch controlled on activation of the high-power mode. The circuit further comprises a control circuit 3 (CTRL) similar to that of FIG. 2, having the function of turning on switch K when the powered device must operate in high-power mode.

As in the embodiment of FIG. 2, a signal for controlling switch K may be issued by any adapted circuit, for example, a microcontroller associated or not with the powered load.

To enable a switching to the stand-by mode despite the presence of regulator 44, circuit 3 may also analyze the voltage across capacitor C4. It is then detected that the voltage across capacitor C4 remains high for a sufficiently long time.

Thus, while in the embodiment of FIG. 2, a single piece of data representative of the D.C. voltage is analyzed (the voltage across capacitor C3), in the embodiment of FIG. 3, two pieces of data representative of this D.C. voltage are analyzed: the voltage across capacitor C3 and that across capacitor C4.

Figure 4:
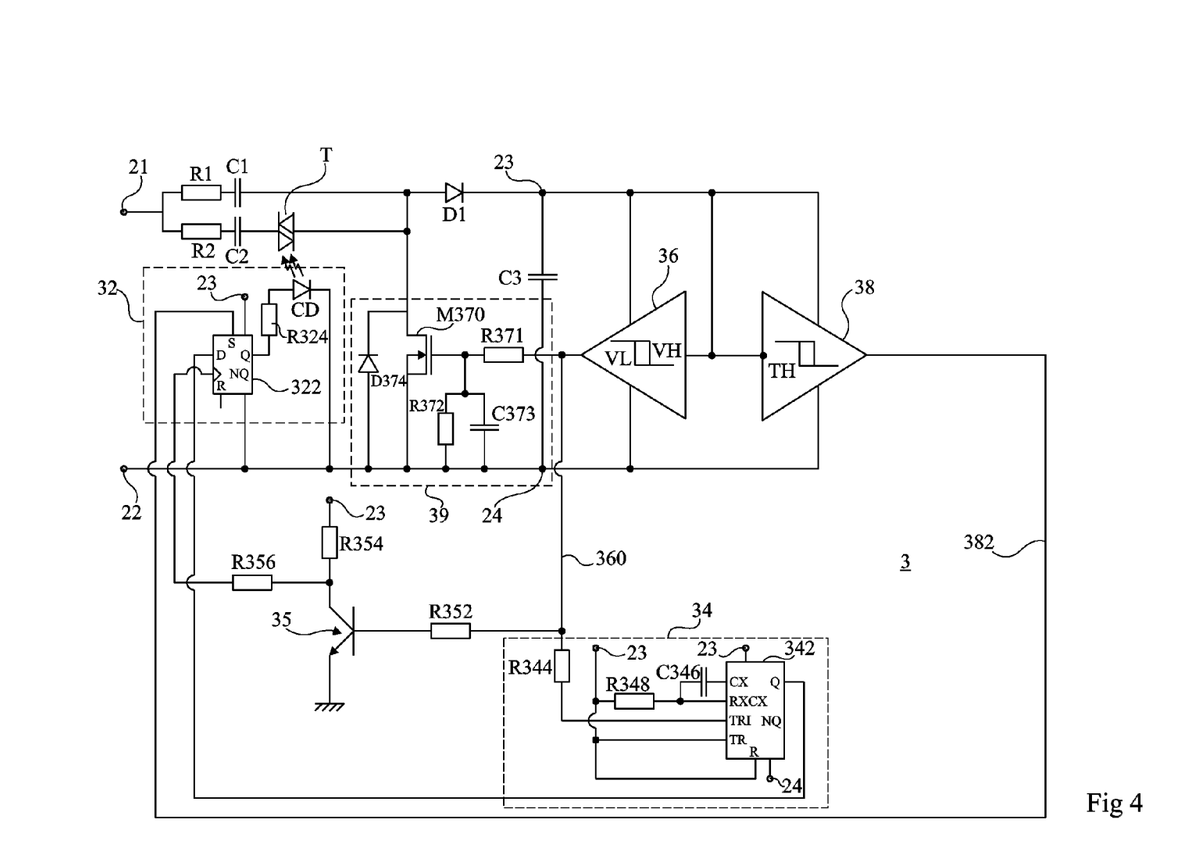
FIG. 4 is a detailed electric diagram of an embodiment of a control circuit adapted to the circuit of FIG. 2.

FIG. 4 is a more detailed electric diagram of circuit 2 of FIG. 2 which specifically details an embodiment of control circuit 3.

Switch K is, in this example, formed of an opto-triac T. This opto-triac is used as an isolation barrier and is controlled by an activation stage 32. Functionally, stage 32 comprises an optical excitation diode CD controlled by a D flip-flop 322, supplied with voltage Vcc between terminals 23 and 24. Direct output Q of flip-flop 322 is connected, via a resistor 324 in series with diode CD, to ground 24. The opto-triac is thus turned on when the Q output of flip-flop 322 is in a high state. The D data input of flip-flop 322 receives a signal from a stage 34 used as a time counter based on a one-shot circuit 342. One-shot circuit 342 is supplied with voltage Vcc (terminals 23 and 24). In the example, the direct Q output of one-shot circuit 342 is connected to the D data input of flip-flop 322. An output 360 of a comparison stage 36 which will be described hereafter is connected, via a resistor R344, to trigger input TRI of one-shot circuit 342. Inputs CX and RXCX setting time constant T0 of counter 342 are interconnected by a capacitor C346, input RXCX being further connected to terminal 23 by a resistor R348. Finally, reset input R and activation input TR of circuit 342 are directly connected to terminal 23.

The function of stage 34 is to generate a time period T0, set by the values of capacitors C346 and resistors R348, on each switching to the high state of output 360.

Comparison stage 36 comprises a hysteresis comparator having its input receiving the voltage of terminal 23. The function of stage 36 is to detect when the voltage across capacitor C3 comes out of a voltage range defined by a first threshold VH and a second lower threshold VL, surrounding a nominal value Vcc of the D.C. voltage.

Output 360 of stage 36 is connected, via a bipolar transistor 35 assembled with a common emitter (or a MOS transistor), to the trigger or clock input of flip-flop 322. More specifically, output 360 is connected by a resistor R352 to the base of transistor 35 having its emitter connected to ground and having its collector connected, by a biasing resistor 354, to terminal 23 and, by a resistor R356, to the trigger input of the flip-flop. The function of this assembly is to provide a high state on the trigger input of the flip-flop except for periods when transistor 35 is on under control of signal 360.

The state of the D input of the flip-flop transmits to the opto-triac under control of its trigger input.

Output 360 of amplifier 36 is further connected to the input of an optional circuit 39 for limiting the consumption of the power supply circuit. Circuit 39 comprises a switch (for example, an N-channel transistor M370) grounding the anode of diode D1. The gate of transistor M370 is connected, by a resistor R371, to output 360 and, by a parallel association of a resistor R372 and of a capacitor C373, to ground. A diode D374 is placed in parallel on transistor M370, the anode of diode D374 being on the side of ground 24. The function of diode D374, for example formed of the substrate diode of transistor M370, is to discharge branch R1-C1 or both branches R1-C1 and R2-C2 during negative halfwaves.

As a variation, circuit 39 is replaced with a Zener diode (DZ, FIG. 2), the output of comparator 36 being then only connected to resistors R352 and R344.

The output of flip-flop 322 is further forced to the high state (input S) by an output signal 382 of a stage 38 of detection of a drop in the D.C. voltage below a third threshold TH. When the voltage across capacitor C3 falls below threshold TH, the output of comparator 38 switches, which forces the activation of triac T independently from the time analysis by stage 34. Threshold TH is lower than threshold VL, itself lower than threshold VH.

Circuits 36 and 39 for example correspond to an embodiment described in document EP-A-1626493 or U.S. Pat. No. 7,483,280 (04-TO-232, B6654)

The operation of the circuit of FIG. 4 will be better understood in the following description of timing diagrams illustrating examples of shapes of signals at different points of the circuit.

It is assumed that the power supply circuit is in steady state, that is, the voltage across capacitor C3 has reached the desired voltage Vcc.

FIGS. 5A, 5B, 5C, and 5D illustrate a first starting mode of triac T. These drawings respectively show examples of the shape of voltage $V_{C3}$ across capacitor C3 providing D.C. voltage Vcc, of output signal V360 of stage 36, of state Q342 of the Q output of one-shot circuit 342, and of state Q322 of the Q output of flip-flop 322, corresponding to the state of triac T.

Figure 5A:
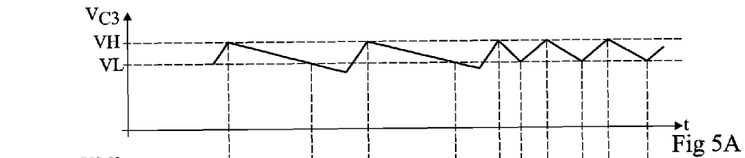
FIGS. 5A, 5B, 5C, and 5D illustrate an embodiment of the circuit of FIG. 4 when the high-power mode is put into service.
Figures 5B, 5C, 5D:
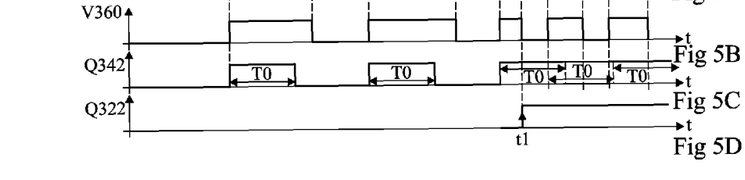
Figures 6A, 6B:
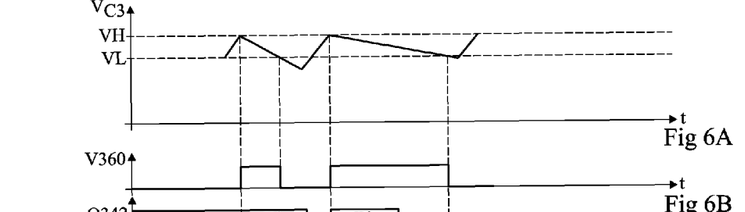
FIGS. 6A, 6B, 6C, and 6D illustrate the operation of the circuit of FIG. 4 in a switching to the stand-by mode.
Figures 6C, 6D:
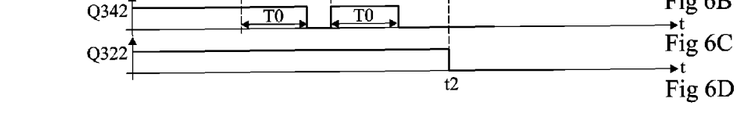

As illustrated in FIG. 5A, for each halfwave, the charge of capacitor C3 stops at level VH and comparator 36 causes the turning-on of transistor M370, thus interrupting the capacitor powering. Transistor M370 is turned back off when the voltage across capacitor C3 becomes lower than threshold VL. In the example of FIG. 5A, triac T is initially blocked. Each time output 360 (signal V360, FIG. 5B) of stage 36 switches to the low state, transistor 35 blocks and a rising edge reaches the trigger input of flip-flop 322. Further, each time output 360 switches to the high state, the time counter is triggered and its output (signal Q342, FIG. 5C) switches to the high state. Output Q342 of counter 342 switches back to the low state at the end of time period T0. In the first two periods (stand-by mode) illustrated in FIGS. 5A to 5D, the counter output has switched back to the low state when voltage $V_{C3}$ reaches threshold VL. Accordingly, the flip-flop output transfers a low state and triac T remains blocked.

At the third period, it is assumed that the voltage across capacitor C3 drops faster and reaches threshold VH at a time t1, before the counter has reached the end of time period T0. As a result, at time t1, flip-flop 322 takes into account the switching of its input. Output Q322 of the flip-flop switches to the high state and turns on the triac. In the following periods, the triac remains controlled to be on while signal Q342 is in the high state when a falling edge appears on signal V360.

In a variation where circuit 39 is replaced with a Zener diode, said diode limits the voltage between the anode of diode D1 and the ground to its threshold value. Thresholds VH and VL must thus be selected according to the voltage level of this Zener diode during operations in STD BY or HP mode. Adapting the control circuit is within the abilities of those skilled in the art.

FIGS. 6A, 6B, 6C, and 6D illustrate a switching to stand-by of the power supply circuit. Triac T is assumed to be active (signal Q322, FIG. 6D) at state 1 and the end of time period T0 is assumed to occur, in the second shown period, while signal V360 has not switched back to the low state yet, that is, while the voltage across capacitor C3 has remained greater than voltage VL. While output Q342 is in the low state, signal V360 switches to the low state (time t2) and output Q322 of the flip-flop switches to the low state. Accordingly, the triac is not restarted at the next period. The system then is in a stand-by mode.

Figures 7A, 7B:
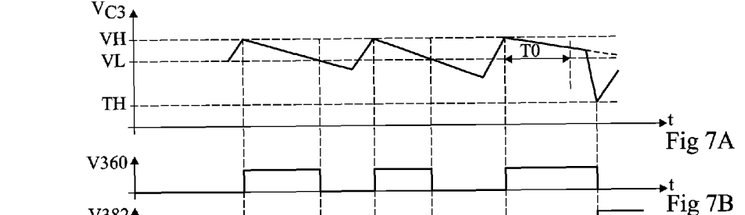
FIGS. 7A, 7B, 7C, and 7D illustrate another embodiment of the circuit of FIG. 4 when the high-power mode is put into service.
Figures 7C, 7D:
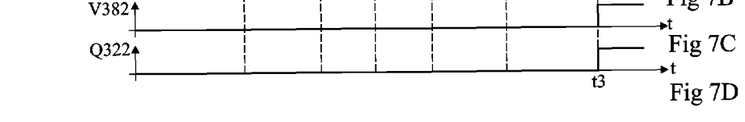

FIGS. 7A, 7B, 7C, 7D are timing diagrams illustrating another starting situation of triac T to activate the second branch of the capacitive power supply. FIG. 7A is an example of the shape of voltage $V_{C3}$ across the output capacitor. FIG. 7B illustrates the corresponding shape of signal V360 at the output of circuit 36. FIG. 7C illustrates corresponding shape V382 at the output of circuit 38. FIG. 7D illustrates the shape of signal Q322 of the Q output of flip-flop 322.

The operation is, for the first two shown periods, similar to that described in relation with FIGS. 5A to 5D. It is assumed that at the third shown period, an abrupt current surge by device 1 occurs after time period TO. Circuits 36 et 34 thus cannot take this current surge into account. However, when the abrupt drop of voltage $V_{C3}$ reaches threshold TH, output 382 of stage 38 switches to the high state and forces the set input (S) of the flip-flop independently from the states present on its other inputs and, accordingly, the switching of its output and the starting of triac T. The full-power branch is then activated.

The described embodiments enable, preferably, to provide a power supply circuit capable of automatically switching between a stand-by mode and a full-power mode without requiring any control signal from the powered device. This makes the power supply circuit particularly versatile while being of a simple structure.

The dimensions to be given to the different components are within the abilities of those skilled in the art based on the functional indications given hereabove and on the voltages desired for level Vcc as well as on the powers desired in stand-by mode and in high-power mode. Further, circuits 32, 34, 36, 38, and 39 which form a preferred embodiment may be modified, provided to respect the described functions.

As a specific embodiment, a circuit such as shown in FIG. 4 may be formed with the following components:
Circuit 32:
D flip-flop 322 known under trade name CD4013A;
resistor R324 of 500Ω; and
opto-triac known under trade name MOC3010.
Circuit 34:
one-shot known under trade name CD4538B;
resistor R348 of 70Ω;
capacitor C346 of 1 microfarad; and
resistors R344, R352, R354, and R356 of 1 kΩ.
Circuit 39:
resistor R371 of 100Ω;
resistor R372 of 1 MΩ; and
capacitor 373 of 1 nanofarad.

Still as a specific example, a ratio of 10 may be provided between capacitors C1 and C2 (for example, respectively 22 nanofarads and 220 nanofarads), which means an available power 11 times greater in high-power mode than in stand-by mode.

Resistors R1 and R2 which are used to limit the surge current have low values (for example, 50Ω) to avoid a significant permanent dissipation.

Various embodiments have been described, various alterations and modifications will occur to those skilled in the art. In particular, although the circuit of FIG. 4 has been described in relation with a capacitive power supply, it can easily transpose to the control of the power switch of the transformer branch of FIG. 3.

Further, any other nature of voltage conversion branch may be used instead of the capacitive and transformer branches, provided for one of the branches to be controlled by a switch bidirectional in terms of current.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A power conversion circuit configured to convert an alternating current (A.C.) power supply voltage into a direct current (D.C.) voltage and to provide the D.C. voltage to a load device, the power conversion circuit comprising:
   a first branch configured to provide a first power level;
   a second branch parallel to said first branch and configured to provide a second power level greater than the first power level, the second branch comprising a switch; and
   a control circuit configured to
      detect a mode of operation of the load device based, at least in part, on a rate at which the D.C. voltage changes by comparing a value of the D.C. voltage with first and second thresholds, said second threshold being lower than the first threshold, and
      control the switch based on the mode of operation of the load device, the control of the switch comprising activating said switch when the value of the D.C. voltage is lower than the second threshold at the end of a time period.

2. The power conversion circuit of claim 1, wherein the first branch comprises a first resistive element, and a first capacitive element coupled in series with the first resistive element; and wherein the second branch comprises a second resistive element, and a second capacitive element coupled in series with the second resistive element and the switch, the second capacitive element of the second branch having a capacitance value greater than a capacitance value of the first capacitive element of the first branch.

3. The power conversion circuit of claim 1, wherein said control circuit is configured to analyze the rate at which the value of the D.C. voltage changes.

4. The power conversion circuit of claim 1, wherein said control circuit comprises:
   a comparison stage configured to compare the value of the D.C. voltage with the first and second thresholds;
   a time counter configured to trigger when the value of the D.C. voltage reaches the first threshold, the time counter having an output configured to switch at an end of the time period; and
   an activation stage configured to activate said switch when the value of the D.C. voltage is lower than the second threshold at the end of said time period.

5. The power conversion circuit of claim 4, wherein the time counter is configured to reset when the value of the D.C. voltage reaches said first threshold.

6. The power conversion circuit of claim 4, wherein said activation stage comprises a flip-flop having: a data input configured to receive the output of said time counter, and a starting input configured to receive a signal depending on a result provided by the comparison stage.

7. The power conversion circuit of claim 4, further comprising a triggering stage configured to trigger the activation stage when the value of the D.C. voltage becomes less than a third threshold, the third threshold being lower than the second threshold.

8. The power conversion circuit of claim 1, wherein said switch comprises at least one of a triac and an opto-triac.

9. A method comprising:
   converting an alternating current (A.C.) signal into a direct current (D.C.) signal;
   providing the D.C. signal to a load device; and
   controlling a power level of the D.C. signal, the controlling of the power level comprising
      providing a first power level to a load device through a first branch of a circuit,
      detecting a mode of operation of the load device based, at least in part, on a rate at which a voltage of the D.C. signal changes by comparing a value of the D.C. voltage with first and second thresholds, said second threshold being lower than the first threshold, and selectively providing a second power level to the load device through a second branch of the circuit by controlling a switch based on the mode of operation of the load device, the controlling of the switch comprising activating the switch when the value of the D.C. voltage is lower than the second threshold at the end of a time period set.

10. The method of claim 9, wherein the controlling of the switch based on the mode of operation of the load device comprises closing the switch in response to detecting a first mode of operation of the load device.

11. The method of claim 10, wherein the controlling of the switch based on mode of operation of the load device comprises opening the switch in response to detecting a second mode of operation of the load device.

12. The method of claim 9, wherein the detecting of the mode of operation of the load device comprises analyzing the voltage of the D.C. signal.

13. The method of claim 12, wherein the analyzing of the voltage comprises comparing the voltage to at least one threshold.

14. The method of claim 12, wherein the analyzing of the voltage comprises determining whether the voltage has changed by at least a threshold amount during a time period.

15. The method of claim 12, wherein the analyzing of the voltage comprises determining the rate at which the voltage changes.

16. A control circuit for a power conversion circuit, the power conversion circuit converting an alternating current (A.C.) power supply voltage into a direct current (D.C.) voltage and providing the D.C. voltage to a load device, the power conversion circuit comprising a first branch configured to provide a first power level, and a second branch parallel to said first branch and configured to provide a second power level greater than the first power level, the second branch comprising a switch, the control circuit comprising:
   circuitry configured to
      detect a mode of operation of the load device based, at least in part, on a rate at which the D.C. voltage changes by comparing a value of the D.C. voltage with first and second thresholds, said second threshold being lower than the first threshold, and
      control the switch based on the mode of operation of the load device, the control of the switch comprising activating said switch when the value of the D.C. voltage is lower than the second threshold at the end of a time period.

17. The control circuit of claim 16, wherein the first branch comprises a first resistive element, and a first capacitive element coupled in series with the first resistive element; and wherein the second branch comprises a second resistive element, and a second capacitive element coupled in series with the second resistive element and the switch, the second capacitive element of the second branch having a capacitance value greater than a capacitance value of the first capacitive element of the first branch.

18. The control circuit of claim 16, wherein said circuitry is configured to analyze the rate at which the value of the D.C. voltage changes.

19. The control circuit of claim 16, wherein said circuitry comprises:
   a comparison stage configured to compare the value of the D.C. voltage with the first and second thresholds;
   a time counter configured to trigger when the value of the D.C. voltage reaches the first threshold, the time counter having an output configured to switch at an end of the time period; and
   an activation stage configured to activate said switch when the value of the D.C. voltage is lower than the second threshold at the end of said time period.

20. The control circuit of claim 19, wherein the time counter is configured to reset when the value of the D.C. voltage reaches said first threshold.

21. The control circuit of claim 19, wherein said activation stage comprises a flip-flop having: a data input configured to receive the output of said time counter, and a starting input configured to receive a signal depending on a result provided by the comparison stage.

22. The control circuit of claim 19, further comprising a triggering stage configured to trigger the activation stage when the value of the D.C. voltage becomes less than a third threshold, the third threshold being lower than the second threshold.

23. The control circuit of claim 16, wherein said switch comprises at least one of a triac and an opto-triac.

24. A control circuit for a power conversion circuit, the power conversion circuit converting an alternating current (A.C.) power supply voltage into a direct current (D.C.) voltage and providing the D.C. voltage to a load device, the power conversion circuit comprising a first branch configured to provide a first power level, and a second branch parallel to said first branch and configured to provide a second power level greater than the first power level, the second branch comprising a switch, the control circuit comprising:
   means for detecting a mode of operation of the load device based, at least in part, on a rate at which the D.C. voltage changes by comparing a value of the D.C. voltage with first and second thresholds, said second threshold being lower than the first threshold; and
   means for controlling the switch based on the mode of operation of the load device, the control of the switch comprising activating said switch when the value of the D.C. voltage is lower than the second threshold at the end of a time period.

25. The control circuit of claim 24, wherein the first branch comprises a first resistive element, and a first capacitive element coupled in series with the first resistive element; and wherein the second branch comprises a second resistive element, and a second capacitive element coupled in series with the second resistive element and the switch, the second capacitive element of the second branch having a capacitance value greater than a capacitance value of the first capacitive element of the first branch.

26. The control circuit of claim 24, wherein said switch comprises at least one of a triac and an opto-triac.

* * * * *